United States Patent [19]
Ward et al.

[11] 4,111,336
[45] Sep. 5, 1978

[54] WEIGHT LOSS CONTROL SYSTEM

[75] Inventors: William H. Ward, Oak Ridge; Henry F. Henderson, Jr., West Paterson; Kenneth H. Kardux, Wayne, all of N.J.

[73] Assignee: H. F. Henderson Industries, West Caldwell, N.J.

[21] Appl. No.: 787,688

[22] Filed: Apr. 14, 1977

[51] Int. Cl.² ............................................. B65G 27/24
[52] U.S. Cl. ........................................ 222/58; 222/63; 177/116; 198/505
[58] Field of Search .............. 222/52, 55, 56, 57, 222/58, 63, 64, 76, 77; 198/505; 177/50, 114, 116, DIG. 3

[56] References Cited

U.S. PATENT DOCUMENTS

| | | | |
|---|---|---|---|
| 2,050,314 | 8/1936 | Grunewald | 222/58 |
| 3,107,820 | 10/1963 | Turner | 222/58 |
| 3,319,828 | 5/1967 | Maxwell | 222/58 X |
| 3,985,266 | 10/1976 | Wright | 222/55 X |
| 4,054,784 | 10/1977 | Ricciardi et al. | 222/58 X |

*Primary Examiner*—Joseph J. Rolla
*Attorney, Agent, or Firm*—Leitner, Palan, Martin & Bernstein

[57] ABSTRACT

A control for a batch bin and a continuous loss bin system having a separate weight measuring device for each bin whose sum at transfer is used to establish continuously digitally desired weights at fixed intervals to be compared with the actual weight in the continuous loss bin to provide an error signal for a continuous feeder.

14 Claims, 2 Drawing Figures

WEIGHT LOSS CONTROL SYSTEM

BACKGROUND OF THE INVENTION

The present invention relates generally to continuous weight loss systems and more specifically to a new, improved control for continuous weight loss systems.

In the field of continuous weight loss systems, the devices include a batch bin located above a continuous loss bin. A feeding device at the outlet of the continuous loss bin is controlled to produce a desired feeding rate. The feeding device is driven by an error signal which is a function of desired weight loss against actual weight loss in the continuous loss bin. Prior systems have used analog means to provide the desired weight signal and compare it on an analog basis with the actual weight signal to produce the error signal. Generally, measurement of the weight in the continuous loss bin is used and compared against an analog derived signal whose initial weight at transfer of the material from the batch bin to the continuous weight loss bin is fixed to a predetermined value. Similarly, the analog systems had to be zeroed during the weight transfer or driven to the predetermined amount. By using a predetermined amount in the analog system, the desired weight does not take into account the actual weight of contents of the continuous loss bin and any variation in the batch amount. Thus the actual weight in the weight loss bin compared against a predetermined and therefore inaccurate desired weight produces erroneous control of the feeding device. Similarly, analog systems use electronic components whose values change with age, thus introducing additional error into the system.

Patents which are considered the state of the art having analog systems are as follows:

U.S. Pat. Nos. 3,319,828; 3,329,313; 3,529,139; 3,532,253; 3,828,869; 3,889,848.

In loss-in-weight, and weight-differential systems presently available, the primary control signal—that is the pre-set weight per unit time signal—is established on an analog basis by a device such as a ramp generator using a capacitance component. Since the accuracy of this capacitance signal deteriorates over a relatively short time, it becomes necessary to re-establish the weight per unit time signal, by refilling the continuous loss bin after a short time interval.

One of the major disadvantages of this concept is that during each refill cycle, the feeding device is locked onto a feed rate signal which is related to the previously established primary rate signal. This results in the feeding device running at some feed rate value not actually related to the required rate during that refill cycle time, therefore causing the feeder to be out of control every time the refill occurs.

The requirement for frequent refilling makes it difficult to provide low capacity continuous weigh feeding; and the out of control cycling time makes it difficult to provide accurate inventory control, since the amount of material fed out during the re-fill time is lost.

An attempt to provide a continuous control of the correct weight of flow is shown in U.S. Pat. No. 3,319,828 by using a load cell to determine the weight in the lower or continuous bin during normal flow and a load cell to measure the combined weight of the two bins during transfer of the materials from the batch bin to the continuous loss bin. Mechanical switching between the two load cells is provided. By using a single load cell to determine the weight of both bins, the cell must have twice the capacity. Thus, with a 0.1 percent accuracy, the error in the combined weight measurements is unacceptable. Similarly, by using a single load cell for continuous measurement during the transfer of material, the measurements would be unstable because of the influence of the material moving from the batch bin to the continuous loss bin.

Thus there exists a need for a control system for a continuous weight loss system wherein the weight of the continuous loss bin and the batch bin are continuously monitored and used to continuously control the feed mechanism without the inherent problems of the analog systems of the prior art.

SUMMARY OF THE INVENTION

The control circuit of the present invention includes separate weight measuring devices for the batch bin and the continuous loss bin. The signals from the two measuring devices are added and converted to a digital signal, just prior to the transfer of a batch of material from the batch bin to the continuous flow bin, and stored in a down counting device. A logic circuit loads the summed digital signal into the down counting device at a preselected value of weight measured from the continuous loss bin. The down counter is decremented at a desired rate so as to provide a signal representative of a desired weight as a function of the total weight of the two bins prior to transfer. The digital desired weight is converted to an analog signal and combined with the weight signal from the continuous loss bin. The difference between the desired weight and the actual weight is an error signal which is used to control the continuous feed means. A timing circuit, responsive to a signal from the logic circuit, activates a sample and hold circuit for the error signal and a transferring device for sufficient period to transfer material from the batch bin to the continuous loss bin.

OBJECTS OF THE INVENTION

An object of the present invention is to provide a continuous control system for a weight loss system.

Another object is to use digital logic to provide a desired weight in a continuous weight loss system.

A further object of the invention is to provide a control system for continuously monitoring the actual weights in a continuous loss bin and a batch bin.

Still another object is to continuously monitor the actual weights in a two bin continuous flow system.

A still further object is to provide a control system for continuous weight loss system which minimizes the non-controlled period of the continuous feed means.

Other objects, advantages and novel features of the present invention will become apparent in the following detailed description of the present invention when considered in conjunction with the accompanying drawings.

DESCRIPTION OF THE PREFERRED EMBODIMENTS

Figure 1:
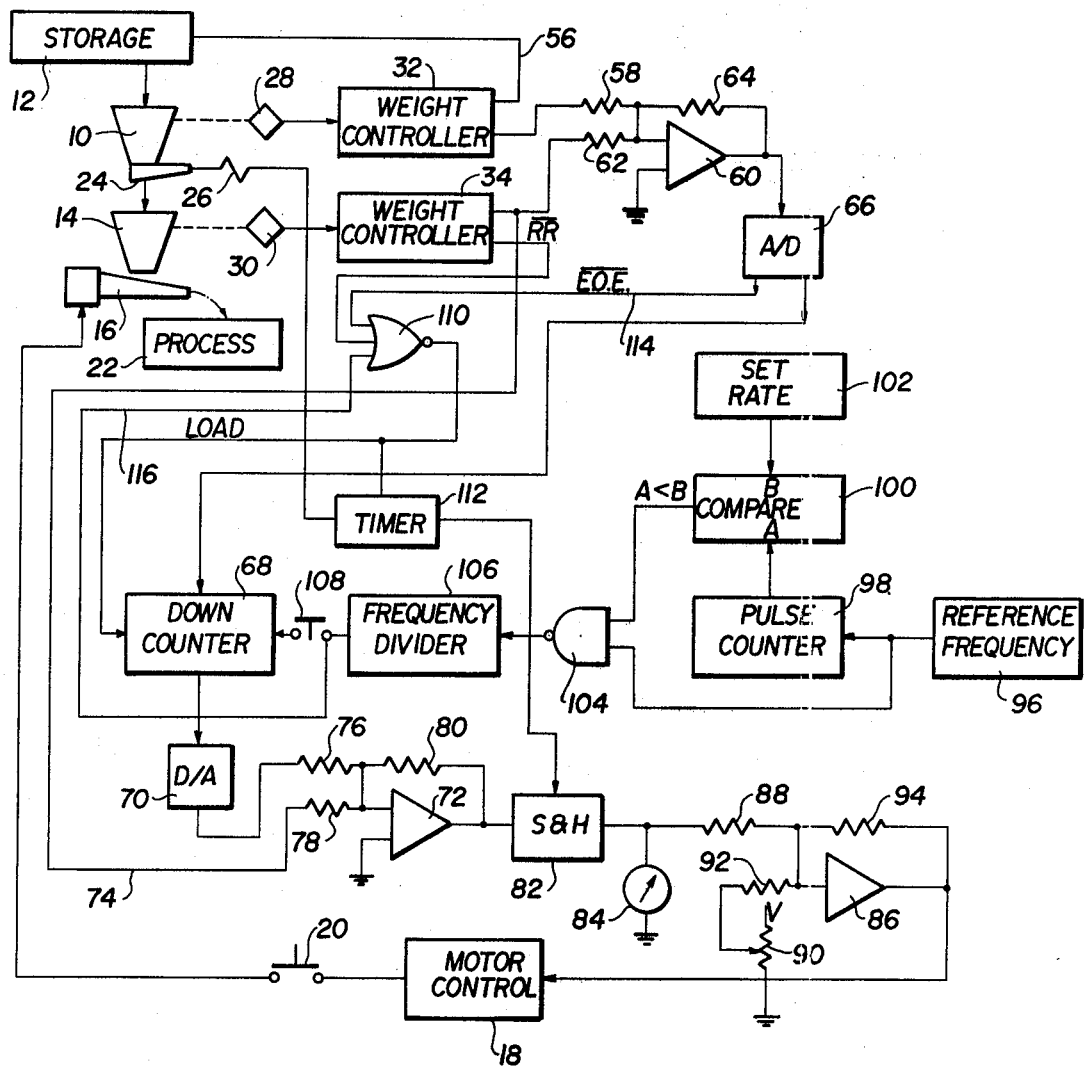
FIG. 1 is a block diagram embodying the control system for material feeding apparatus of the present invention.

FIG. 1, which illustrates the preferred embodiment of the control system of the present invention, includes a batch bin 10 for receiving of material from a material storage device 12. Below batch bin 10 is a continuous loss bin 14 having a continuous feeding device 16 therebelow. The motor control 18 connected through on and off switch 20 controls the rate of the continuous feeding device 16 which provides material to a process 22, illustrated graphically as a box. The outlet of the batch bin 10 includes a transfer device 24 which allows the batch bin 10 to accumulate a pre-set batch load to be transferred to the continuous loss bin 14 at a pre-selected weight of material in the continuous loss bin 14. A solenoid or other control device 26 is shown graphically to represent the control of the transfer device 24 at the outlet of the batch bin 10.

Load cell 28 determines the weight of the material in the batch bin 10 and load cell 30 determines the weight in the continuous loss bin 14. The signals from the load cell 28 controls the transfer of material from the storage device 12 to the batch bin 10 to provide a predetermined batch of material. Load cell 30 also provides signals which are used with motor control 18 to adjust the rate of the continuous feed device 16. These elements of the system just described are well known in the prior art as are their inter-relationship and thus a detailed description of the structure of the elements is not needed.

Figure 2:
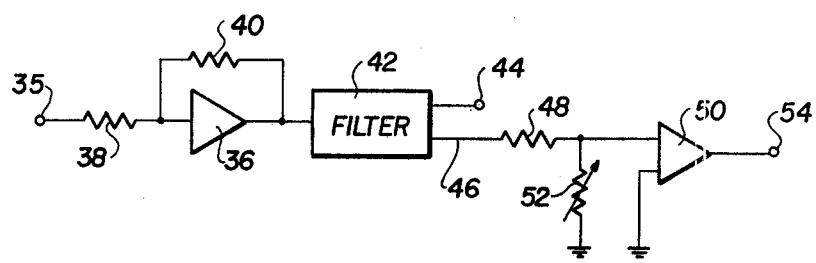
FIG. 2 is a simplified schematic drawing of a weight controller used in FIG. 1.

The signals from the load cells 28 and 30 are processed and conditioned in weight controllers 32 and 34 respectively. These weight controllers are stock numbers 74 STEW, available from Henderson Industries, West Caldwell, New Jersey. A portion of the weight controller used for the present control is illustrated in FIG. 2 and includes an input 35 from the load cell to an amplifier stage 36 including input resistors 38 and feedback resistor 40. The output of amplifier 36 is fed to a filter 42 which provides an analog signal output 44 and inverted analog signal on line 46. The inverted analog output on line 46 is transmitted through a resistor 48 to a saturating summing amplifier 50. Also connected to the input of saturating summing amplifier 50 is a variable resistor 52. The output of saturating summing amplifier 50 is at 54 and represents a high logic signal based on the value of the inverted output on line 46 and the adjustable value of resistor 52. The output terminal 44 will be referred to as the analog weight signal output and the output terminal 54 will be referred to as the control signal output.

As illustrated in FIG. 1, the control signal output of weight control 32 is connected to the storage device 12 by line 56 to control the transfer of material from the storage device 12 to the batch bin 10 so as to accumulate a desired batch weight. Analog weight output of weight controller 32 is connected via resistor 58 to a summing amplifier 60. The other input to the summing amplifier 60 is the analog weight signal from weight controller 34 through resistor 62. A feedback resistor 64 is connected between the output and the summing input of summing amplifier 60. The output of summing amplifier 60 is connected to an analog to digital converter 66. It should be noted that whereas variable resistor 52 in FIG. 2 for weight controller 32 is adjusted for the batch weight for batch bin 10, the resistor 52 for controller 34 is adjusted for a minimum weight which can be tolerated in a continuous loss bin 14 before a transfer of additional material from batch bin 10 should be initiated.

The output of the A/D converter 66 is provided to a digital storage device 68 which is represented as a down counter. The output of the down counter 68 is converted by a digital to analog converter 70 to a negative analog signal to be combined in summing amplifier 72 with the analog weight signal output from weight controller 34 via line 74. Input and feedback resistors 76, 78, and 80 are provided for the summing amplifier 72. The output of the down counter 68 and consequently the negative analog signal from D/A converter 70 represents a predicted weight or a desired weight at a fixed time which is compared against the actual analog weight from the continuous loss bin 14. The output of summing amplifier 72 is through a sample and hold circuit 82 whose output is connected to a meter 84 and to a summing amplifier 86 through resistor 88. A second input to the summing amplifier 86 is through a variable resistor 90 and a resistor 92. The variable resistor 90 is set for the minimum feed rate of the continuous feeding device 16. A feedback resistor 94 is provided between the output and the input of summing amplifier 86. The output of summing amplifier 86 is the error signal which is provided to motor control 18 to control the feed rate of the continuous feeding device 16.

The contents of down counter 68 is decremented at a desired rate so as to represent a predicted or desired weight at a selected time to be compared to the actual weight in continuous loss bin 14. The circuitry to produce the decrement rate includes a reference frequency source 96 connected to and driving a pulse counter 98. The value of the pulse counter 98 is compared in comparator 100 with a desired rate value manually or electronically inserted into the set rate counter 102. The output of comparator 100 is combined in NAND gate 104 with the pulses from reference frequency source 96 to drive a frequency divider 106. As long as the pulse count from counter 98 is less than the count provided by set rate counter 102, a logic 1 is provided at the output of comparator 100 to NAND gate 104 so as to allow the frequency pulses from divider frequency source 96 to be transmitted to the frequency divider 106. Once the value in counter 98 exceeds the value in counter 102, the output of comparator 100 becomes logic 0 therefore blocking NAND gate 104 and preventing the pulses from reference frequency source 96 from being transmitted to the frequency divider 106. Pulse counter 98 continues counting the pulses from reference frequency source 96 until it zeroes itself and thus starts the process over again, i.e., assuming a value below the value of the set rate and allowing the frequency pulses 96 to be transmitted through NAND gate 104 to the frequency divider 106. The frequency divider 106 provides output pulses to down counter 68 at a fixed count of received pulses. A switch 108 interconnects down counter 68 and frequency divider 106. As noted previously, the rate at which the down counter 68 is decremented is determined by the pulses from the decrementing circuit just described.

The initial value stored in down counter 68 is the sum of the weight of the material in batch bin 10 and the weight of the material in the continuous loss bin 14 just prior to transfer of the material in the batch bin 10 to the continuous loss bin 14. The logic to produce this transfer includes a NOR gate 110 and a timer 112 in addition to the circuitry previously described. The sum of the weight in the batch bin 10 and the continuous loss bin 14 is provided at the output of summing amplifier 60 to the analog to digital converter 66. Once the analog signal has been encoded, an inverse of the encode signal $\overline{EOE}$ is produced on line 114 to NOR gate 110. The inverse of the refill request signal $\overline{RR}$, from weight controller 34 the inverse of the end of encode signal $\overline{EOE}$, via line 114, and the pulse signal from the frequency divider 106 via line 116 are combined in NOR gate 110 to provide a load signal LOAD to the down counter 68 to allow it to load the digital signal representing the sums of the weight in both bins prior to transfer to the down counter 68. By combining the end of encode signal and the refill request signal with the output of the frequency divider 106, the transfer of the new reference weight to the down counter signal 68 is provided in between the pulses from frequency divider 106. Thus the control system is not interrupted to provide the new reference value for the down counter 68 as is normally experienced in the analog systems of the prior art and the decrementation of the down counter 68 is also not interrupted.

The load signal LOAD is also used to activate timer 112 which is connected to solenoid 26 to open transfer device 24 for a fixed period of time sufficient to allow transfer of the material from the batch bin 10 to the continuous loss bin 14. The second output of timer 112 is connected to the sample and hold circuit 82 to sample and hold the error signal at the output of summing amplifier 72 so as to provide a single error signal to the motor control 18 during the transfer of material from the batch bin 10 to the continuous loss bin 14. Since the present system includes digital controls and digital logic to provide the desired or predicted weight, the time that the motor control is locked need only be limited to the time it takes to transfer material from batch bin 10 to continuous loss bin 14. Although motor control 18 is locked during this period, the control system is not inactive or out of control since it is continuously monitoring the weights in batch bin 10 and continuous weight loss bin 14. Thus weight information is not lost to the control system during the transfer. The present control system knows exactly how much material was fed out during the transfer of the material from the batch bin 10 to the continuous weight loss bin 14 and thus provides better control of inventory as well as more quickly and accurately provide new control signals for the motor control 18.

The value on the down counter is decremented to provide a predicted or desired weight signal in a staircase fashion at fixed time intervals. The selection of the fixed time intervals is relatively short so as to provide what appears to the motor control 18 and the summing amplifiers 72 as a continuous desired weight signal. Devices 96 through 106 are only illustrative of one particular circuit which may be produced to decrement the down counter 68 at a rate such that the contents of down counter 68 represents a desired or predicted weight as a function of the desired material weight loss rate from the system into process 22. Other logic circuits may be used. Similarly, the NOR gate 110 is but an example of logic to produce the interrelationship and the desired results to load the sum of the weight of materials in the batch bin 10 and the continuous loss bin 14 just prior to transfer of material from the batch bin to the continuous weight loss bin.

From the preceding description of the preferred embodiment it is evident that the objects of the invention are obtained and although the invention has been described and illustrated in detail, it is to be clearly understood that the same is by way of illustraiton and example only and is not to be taken by way of limitation. The spirit and scope of the invention is being limited only by the terms of the appended claims.

What is claimed:

1. In a material feeding apparatus having a first storage means for storing a preselected weight of material, a transfer means at the outlet of said first storage means, a second storage at the outlet of said transfer means for storing material, a continuous feed means at the outlet of said second storage means and control means for operating said transfer means and said continuous feed means the improvement being said control means which comprises:
    first measuring means for measuring the weight of material in said first storage means;
    second measuring means for continuously measuring the weight of material in said second storage means;
    logic means for providing a control signal for said continuous feed means as a function of the weight measurement of said second measuring means relative to the sum of weight measurements of said first and second measuring means prior to opening of said transfer means.

2. The material feeding apparatus according to claim 1 wherein said logic means includes digital weight prediction means responsive to weight measurements of said first and second measuring means to provide desired weights at specific time intervals and a means for comparing said desired weights and weight measurements of said second measuring means to produce said control signal for said continuous feed means.

3. The material feeding apparatus according to claim 2 wherein said weight prediction means includes means for digitally storing weight measurments from said first and second measuring means immediately prior to said transfer means opening and means for decrementing said storing means to provide said desired weights.

4. The material feeding apparatus according to claim 2 wherein said weight prediction means includes a down counter for storing sum of weight measurements from said first and second measuring means, means for counting down said counter at a fixed rate and a digital to analog converter for converting the contents of said down counter to said desired weight for a desired feeding rate.

5. The material feeding apparatus according to claim 4 wherein said comparing means includes an analog comparator for comparing said desired weight with the weight measurement from said second measuring means and said countdown means includes a variable reference for modifying said desired weight as a function of a desired feeding rate.

6. The material feeding apparatus according to claim 2 wherein said comparing means includes a sample and hold means for holding said control signal for said continuous feed means at a fixed value during said transfer.

7. The material feeding apparatus according to claim 6 including timing means responsive to a low weight signal from said second measuring means for activating said transfer means and said sample and hold means for a fixed period of time.

8. A control system for material feeding apparatus comprising:
    first means for measuring the weight of a batch supply;
    second means for measuring the weight of a continuous loss supply;
    means for transferring said batch supply to said continuous loss supply;

logic means for continuously providing a desired weight signal at fixed intervals based on the sum of the signals of said first and second measuring means immediately prior to said batch supply being transferred to said continuous loss supply; and means for providing a weight error signal responsive to said desired weight signal and said signal of said second measuring means.

9. A control system according to claim 8 wherein said logic means includes means for digitally storing the sum of signals from said first and second measuring means immediately prior to said transfer and means for continuously decrementing said digital storage means at a rate sufficient to provide desired weight signals at said fixed intervals.

10. A control system according to claim 9 wherein said logic means further includes a digital to analog converter for converting the decremental sum to an analog desired weight signal and wherein said error means includes analog means for comparing said desired weight signal with the weight signal from said second measuring means to provide said weight error signals.

11. A control system according to claim 10 wherein said error means includes means connected to the output of said analog comparing means for sampling the output of said analog comparing means and holding the sampled value during said transfer.

12. A control system according to claim 9 wherein said digital storage means includes a down counter and said logic means includes means for summing said signals from said first and second measuring means and means for inserting the sum from said summing means to said digital storage means at a preselected value of said signal of said second measuring means.

13. A control system according to claim 12 wherein said decrementing means includes a means for producing pulses and means for accumulating said pulses to produce said decrementing at said fixed interval, and said inserting means receives pulses from said accumulating means to insert said sum between one of said fixed intervals.

14. A control system according to claim 12 wherein said error means includes means for sampling and holding said weight error signal and wherein said logic means includes a timing means for providing a batch transfer signal and a sample and hold signal for a fixed period of time in response to said preselected value of said signal of said second measuring means.

* * * * *